(12) United States Patent
Fuhr et al.

(10) Patent No.: US 9,350,002 B2
(45) Date of Patent: May 24, 2016

(54) THERMAL MANAGEMENT OF A BATTERY SYSTEM

(75) Inventors: Jason D. Fuhr, Sussex, WI (US); Chris Bonin, South Milwaukee, WI (US)

(73) Assignee: Johnson Controls—SAFT Advanced Power Solutions LLC, Wilmington, DE (US)

( * ) Notice: Subject to any disclaimer, the term of this patent is extended or adjusted under 35 U.S.C. 154(b) by 976 days.

(21) Appl. No.: 13/174,487

(22) Filed: Jun. 30, 2011

(65) Prior Publication Data

US 2012/0003522 A1    Jan. 5, 2012

Related U.S. Application Data

(60) Provisional application No. 61/360,756, filed on Jul. 1, 2010.

(51) Int. Cl.
*H01M 10/50* (2006.01)
*H01M 2/10* (2006.01)
(Continued)

(52) U.S. Cl.
CPC .......... *H01M 2/1083* (2013.01); *H01M 2/1077* (2013.01); *H01M 10/613* (2015.04); *H01M 10/625* (2015.04); *H01M 10/643* (2015.04);
(Continued)

(58) Field of Classification Search
CPC ..................... H01M 10/5046; H01M 10/5055; H01M 10/5059; H01M 2/1083; H01M 2/1077; H01M 10/625; H01M 10/6568; H01M 10/6551; H01M 10/6557; H01M 10/6555; H01M 10/643; H01M 10/613
USPC ....................................................... 429/120
See application file for complete search history.

(56) References Cited

U.S. PATENT DOCUMENTS

| | | |
|---|---|---|
| 5,460,900 A | 10/1995 | Rao et al. |
| 5,558,950 A | 9/1996 | Ovshinsky et al. |

(Continued)

FOREIGN PATENT DOCUMENTS

| | | |
|---|---|---|
| DE | 102 23 782 A1 | 12/2003 |
| DE | 102004005394 A1 | 8/2005 |

(Continued)

OTHER PUBLICATIONS

Written Opinion for International Application No. PCT/US2011/042497; mail date Dec. 22, 2011; 3 pages.

(Continued)

*Primary Examiner* — Sarah A Slifka
*Assistant Examiner* — Brent Thomas
(74) *Attorney, Agent, or Firm* — Fletcher Yoder, P.C.

(57) ABSTRACT

A battery module includes a plurality of electrochemical cells arranged within the battery module and a thermal management system configured to provide thermal management to the plurality of electrochemical cells. The thermal management system includes a first thermal plate provided adjacent a first side of the battery module and a second thermal plate provided adjacent a second side of the battery module opposite that of the first side of the battery module. The first thermal plate includes a series of fins that extend from a surface of the first thermal plate from the first side of the battery module to the second side of the battery module. The second thermal plate comprises a series of fins that extend from a surface of the second thermal plate from the second side of the battery module to the first side of the battery module.

20 Claims, 12 Drawing Sheets

(51) Int. Cl.
*H01M 10/625* (2014.01)
*H01M 10/6568* (2014.01)
*H01M 10/6551* (2014.01)
*H01M 10/6557* (2014.01)
*H01M 10/6555* (2014.01)
*H01M 10/643* (2014.01)
*H01M 10/613* (2014.01)

(52) U.S. Cl.
CPC ...... *H01M 10/6551* (2015.04); *H01M 10/6555* (2015.04); *H01M 10/6557* (2015.04); *H01M 10/6568* (2015.04)

(56) References Cited

U.S. PATENT DOCUMENTS

| | | | |
|---|---|---|---|
| 6,512,347 | B1 | 1/2003 | Hellmann et al. |
| 7,291,420 | B2 | 11/2007 | Bitsche et al. |
| 2002/0012833 | A1 | 1/2002 | Gow et al. |
| 2002/0064707 | A1 | 5/2002 | Wessman |
| 2002/0125860 | A1 | 9/2002 | Schworm et al. |
| 2002/0177035 | A1 | 11/2002 | Oweis et al. |
| 2003/0013009 | A1 | 1/2003 | Dansui et al. |
| 2003/0017383 | A1 | 1/2003 | Ura et al. |
| 2004/0229099 | A1 | 11/2004 | Standke et al. |
| 2004/0247996 | A1 | 12/2004 | Smith et al. |
| 2005/0170240 | A1 | 8/2005 | German et al. |
| 2007/0122692 | A1* | 5/2007 | Smith et al. .............. 429/87 |
| 2008/0305388 | A1 | 12/2008 | Haussman |
| 2009/0004557 | A1 | 1/2009 | Lasarov et al. |
| 2009/0023056 | A1 | 1/2009 | Adams et al. |
| 2009/0111010 | A1* | 4/2009 | Okada et al. .............. 429/120 |
| 2010/0047682 | A1 | 2/2010 | Houchin-Miller et al. |
| 2010/0136405 | A1 | 6/2010 | Johnson et al. |
| 2010/0276132 | A1* | 11/2010 | Payne .............. F28D 15/0266 165/169 |
| 2011/0052960 | A1* | 3/2011 | Kwon et al. .............. 429/120 |

FOREIGN PATENT DOCUMENTS

| | | |
|---|---|---|
| DE | 10 2007 009 315 A1 | 8/2007 |
| EP | 0 917 230 B1 | 5/1999 |
| EP | 1191616 A1 | 3/2002 |
| EP | 1237209 A1 | 9/2002 |
| EP | 1274137 B1 | 1/2003 |
| EP | 1990849 A1 | 11/2008 |
| EP | 1990860 A1 | 11/2008 |
| EP | 1990862 A1 | 11/2008 |
| EP | 2031672 A1 | 3/2009 |
| EP | 2187473 | 5/2010 |
| JP | 2006-092935 A | 4/2006 |

OTHER PUBLICATIONS

PCT International Search Report dated May 1, 2011; PCT/US2011/042497; 3 pages.
International Preliminary Report on Patentability and English translation of the Written Opinion for International Application No. PCT/EP2008/008712, dated Jul. 1, 2010, 7 pages.
International Preliminary Report on Patentability and English translation of the Written Opinion for International Application No. PCT/EP2008/008712, dated May 14, 2010, 7 pages.
International Search Report for Application No. PCT/EP2008/008712, mailing date Feb. 4, 2009, 4 pages.
Extended European Search Report for EP Application No. 11801378.8 dated May 6, 2014; 7 pgs.
First Office Action for Chinese Patent Application No. 201180038717.X issued Nov. 4, 2014.

* cited by examiner

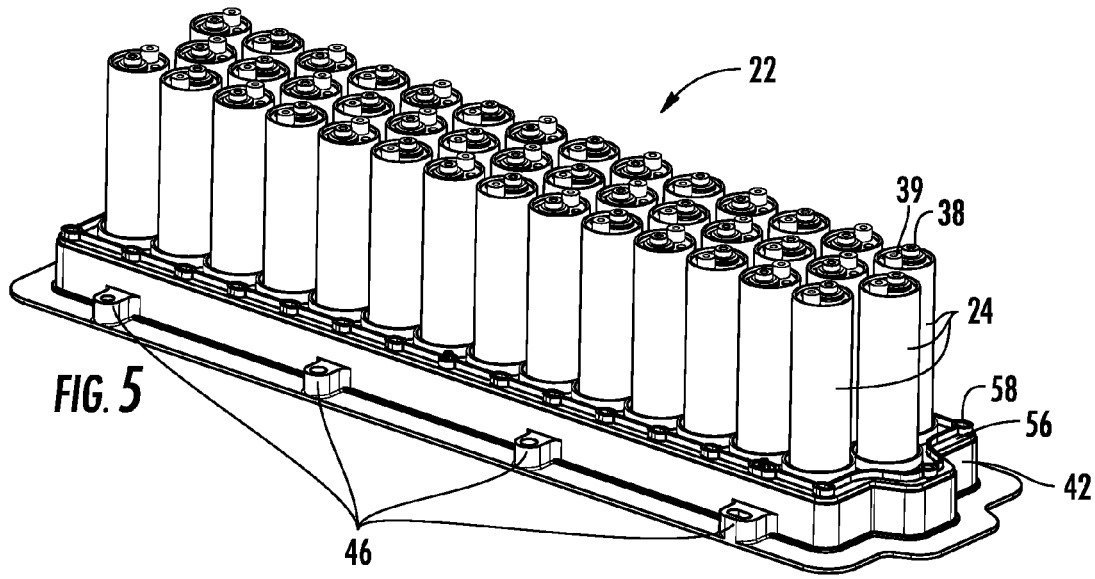
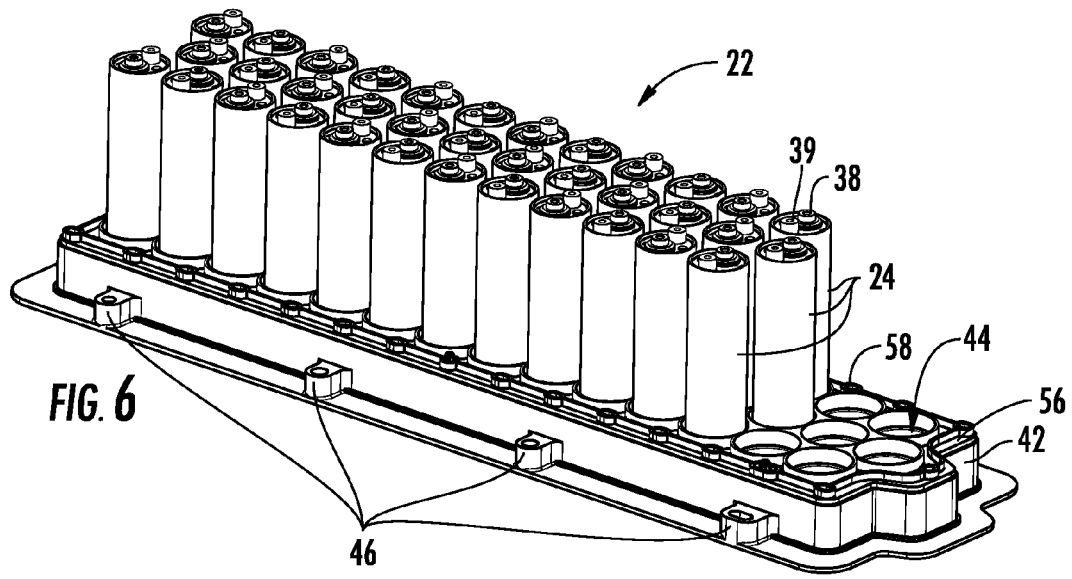

THERMAL MANAGEMENT OF A BATTERY SYSTEM

CROSS-REFERENCE TO RELATED PATENT APPLICATIONS

This application claims the benefit of and priority to U.S. Provisional Application No. 61/360,756, filed Jul. 1, 2010, the entire disclosure of which is incorporated herein by reference.

BACKGROUND

The present application relates generally to the field of batteries and battery systems. More specifically, the present application relates to batteries and battery systems that may be used in vehicle applications to provide at least a portion of the motive power for the vehicle.

Vehicles using electric power for all or a portion of their motive power (e.g., electric vehicles (EVs), hybrid electric vehicles (HEVs), plug-in hybrid electric vehicles (PHEVs), and the like, collectively referred to as "electric vehicles") may provide a number of advantages as compared to more traditional gas-powered vehicles using internal combustion engines. For example, electric vehicles may produce fewer undesirable emission products and may exhibit greater fuel efficiency as compared to vehicles using internal combustion engines (and, in some cases, such vehicles may eliminate the use of gasoline entirely, as is the case of certain types of PHEVs).

As electric vehicle technology continues to evolve, there is a need to provide improved power sources (e.g., battery systems or modules) for such vehicles. For example, it is desirable to increase the distance that such vehicles may travel without the need to recharge the batteries. It is also desirable to improve the performance of such batteries and to reduce the cost associated with the battery systems.

One area of improvement that continues to develop is in the area of battery chemistry. Early electric vehicle systems employed nickel-metal-hydride (NiMH) batteries as a propulsion source. Over time, different additives and modifications have improved the performance, reliability, and utility of NiMH batteries.

More recently, manufacturers have begun to develop lithium-ion batteries that may be used in electric vehicles. There are several advantages associated with using lithium-ion batteries for vehicle applications. For example, lithium-ion batteries have a higher charge density and specific power than NiMH batteries. Stated another way, lithium-ion batteries may be smaller than NiMH batteries while storing the same amount of charge, which may allow for weight and space savings in the electric vehicle (or, alternatively, this feature may allow manufacturers to provide a greater amount of power for the vehicle without increasing the weight of the vehicle or the space taken up by the battery system).

It is generally known that lithium-ion batteries perform differently than NiMH batteries and may present design and engineering challenges that differ from those presented with NiMH battery technology. For example, lithium-ion batteries may be more susceptible to variations in battery temperature than comparable NiMH batteries, and thus systems may be used to regulate the temperatures of the lithium-ion batteries during vehicle operation. The manufacture of lithium-ion batteries also presents challenges unique to this battery chemistry, and new methods and systems are being developed to address such challenges.

It would be desirable to provide an improved battery module and/or system for use in electric vehicles that addresses one or more challenges associated with NiMH and/or lithium-ion battery systems used in such vehicles. It also would be desirable to provide a battery module and/or system that includes any one or more of the advantageous features that will be apparent from a review of the present disclosure.

SUMMARY

According to an exemplary embodiment, a battery module includes a plurality of electrochemical cells arranged within the battery module and a thermal management system configured to provide thermal management to the plurality of electrochemical cells. The thermal management system includes a first thermal plate provided adjacent a first side of the battery module and a second thermal plate provided adjacent a second side of the battery module opposite that of the first side of the battery module. The first thermal plate includes a series of fins that extend from a surface of the first thermal plate from the first side of the battery module to the second side of the battery module. The second thermal plate comprises a series of fins that extend from a surface of the second thermal plate from the second side of the battery module to the first side of the battery module.

According to an exemplary embodiment, a battery module includes a plurality of electrochemical cells and a thermal management system configured to provide thermal management to the plurality of electrochemical cells. The thermal management system includes a first manifold having a series of projections that extend from the first manifold and in between a first portion of the plurality of cells and a second manifold having a series of projections that extend from the second manifold and in between a second portion of the plurality of cells. The projections of the first manifold extend toward the second manifold and the projections of the second manifold extend toward the first manifold.

BRIEF DESCRIPTION OF THE DRAWINGS

FIGS. 5-6 are perspective views of a portion of a battery module for use in the battery system of FIGS. 3-4 according to an exemplary embodiment.

DETAILED DESCRIPTION

Figure 1:
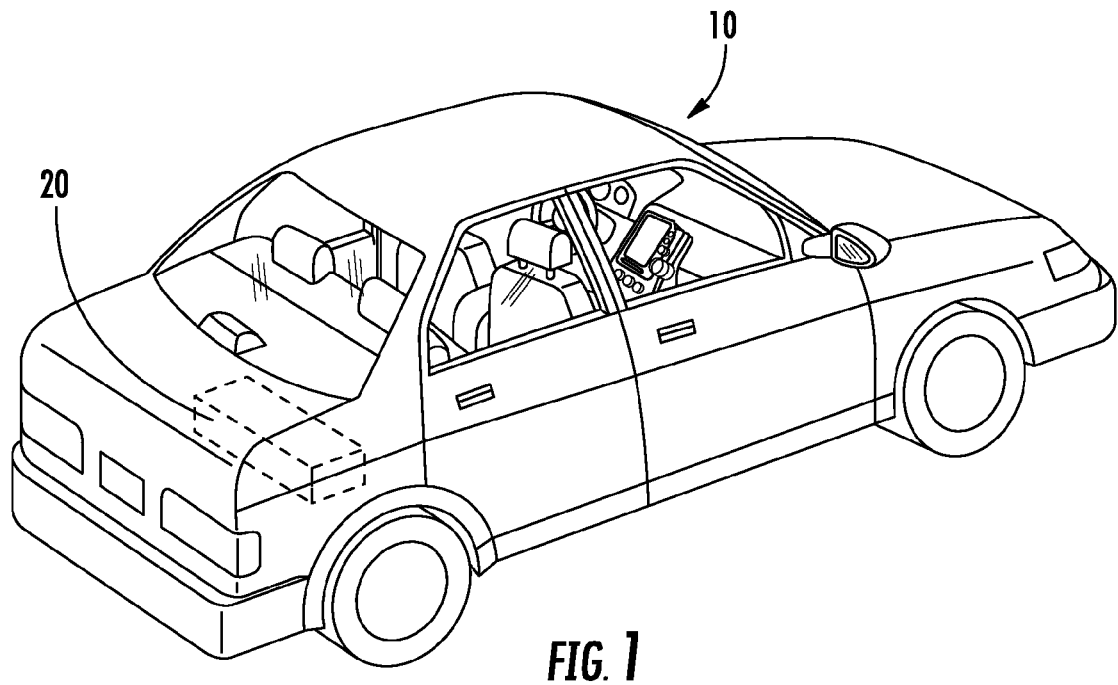
FIG. 1 is a perspective view of a vehicle including a battery system according to an exemplary embodiment.

FIG. 1 is a perspective view of a vehicle 10 in the form of an automobile (e.g., a car) having a battery system 20 for providing all or a portion of the motive power for the vehicle 10. Such a vehicle 10 can be an electric vehicle (EV), a hybrid electric vehicle (HEV), a plug-in hybrid electric vehicle (PHEV), or other type of vehicle using electric power for propulsion (collectively referred to as "electric vehicles").

Although the vehicle 10 is illustrated as a car in FIG. 1, the type of vehicle may differ according to other exemplary embodiments, all of which are intended to fall within the scope of the present disclosure. For example, the vehicle 10 may be a truck, bus, industrial vehicle, motorcycle, recreational vehicle, boat, or any other type of vehicle that may benefit from the use of electric power for all or a portion of its propulsion power.

Although the battery system 20 is illustrated in FIG. 1 as being positioned in the trunk or rear of the vehicle, according to other exemplary embodiments, the location of the battery system 20 may differ. For example, the position of the battery system 20 may be selected based on the available space within a vehicle, the desired weight balance of the vehicle, the location of other components used with the battery system 20 (e.g., battery management systems, vents, or cooling devices, etc.), and a variety of other considerations.

Figure 2:
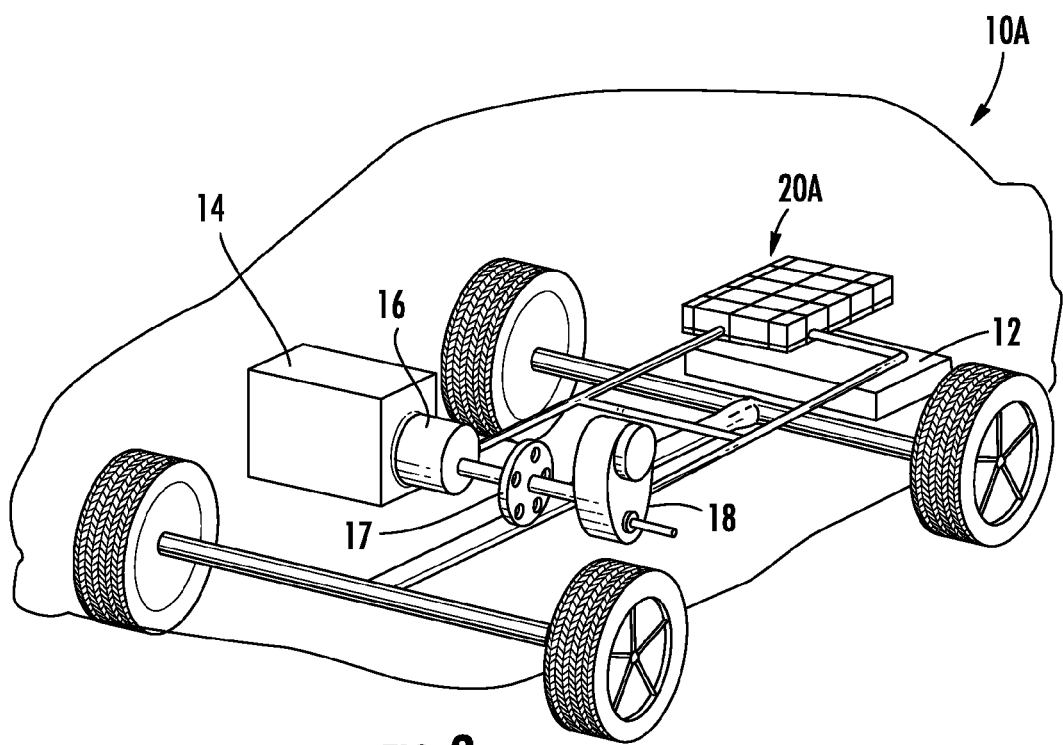
FIG. 2 is a cutaway schematic view of a vehicle including a battery system according to an exemplary embodiment.

FIG. 2 illustrates a cutaway schematic view of a vehicle 10A provided in the form of an HEV according to an exemplary embodiment. A battery system 20A is provided toward the rear of the vehicle 10A proximate a fuel tank 12 (the battery system 20A may be provided immediately adjacent the fuel tank 12 or may be provided in a separate compartment in the rear of the vehicle 10A (e.g., a trunk) or may be provided elsewhere in the vehicle 10A). An internal combustion engine 14 is provided for times when the vehicle 10A utilizes gasoline power to propel the vehicle 10A. An electric motor 16, a power split device 17, and a generator 18 are also provided as part of the vehicle drive system.

Such a vehicle 10A may be powered or driven by just the battery system 20A, by just the engine 14, or by both the battery system 20A and the engine 14. It should be noted that other types of vehicles and configurations for the vehicle drive system may be used according to other exemplary embodiments, and that the schematic illustration of FIG. 2 should not be considered to limit the scope of the subject matter described in the present application.

According to various exemplary embodiments, the size, shape, and location of the battery systems 20, 20A, the type of vehicles 10, 10A, the type of vehicle technology (e.g., EV, HEV, PHEV, etc.), and the battery chemistry, among other features, may differ from those shown or described.

Figure 3:
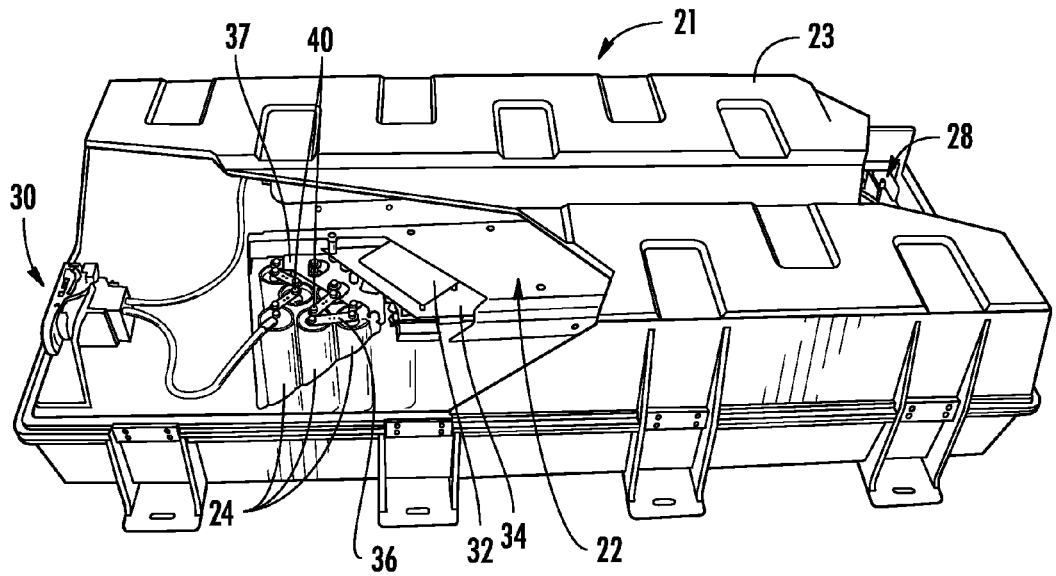
FIGS. 3-4 are partial cutaway views of a battery system according to an exemplary embodiment.
Figure 4:
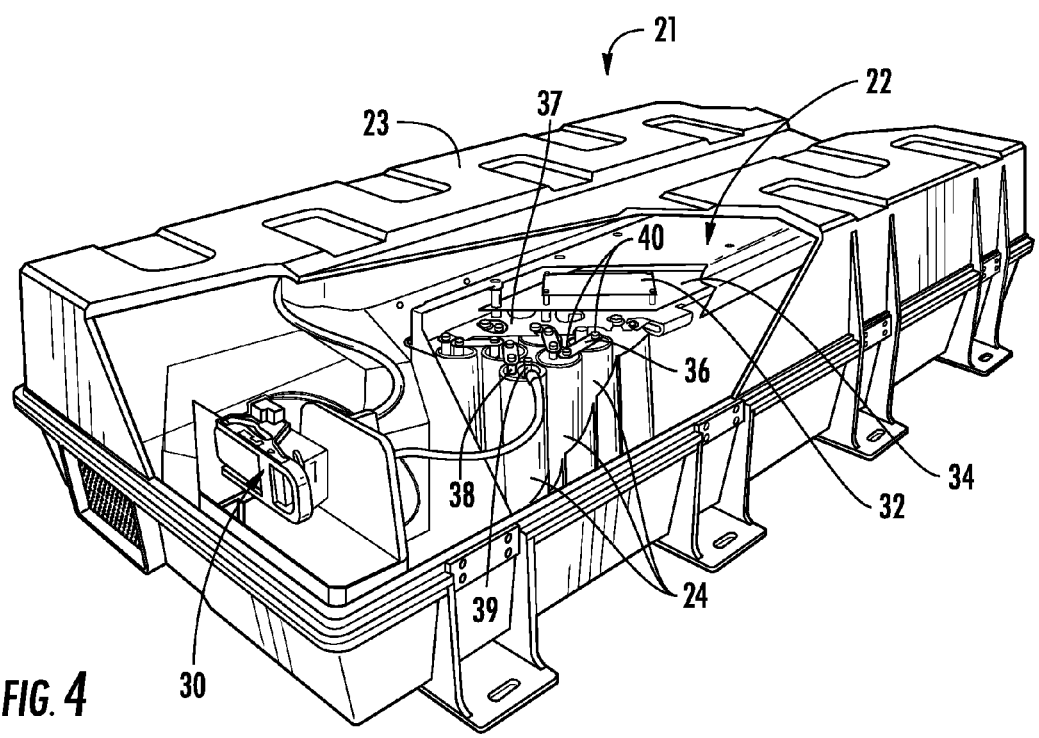

Referring now to FIGS. 3-4, partial cutaway views of a battery system 21 are shown according to an exemplary embodiment. According to an exemplary embodiment, the battery system 21 is responsible for packaging or containing electrochemical batteries or cells 24, connecting the electrochemical cells 24 to each other and/or to other components of the vehicle electrical system, and regulating the electrochemical cells 24 and other features of the battery system 21. For example, the battery system 21 may include features that are responsible for monitoring and controlling the electrical performance of the battery system 21, managing the thermal behavior of the battery system 21, containing and/or routing of effluent (e.g., gases that may be vented from a cell 24), and other aspects of the battery system 21.

According to the exemplary embodiment as shown in FIGS. 3-4, the battery system 21 includes a cover or housing 23 that encloses the components of the battery system 21. Included in the battery system are two battery modules 22 located side-by-side inside the housing 23. According to other exemplary embodiments, a different number of battery modules 22 may be included in the battery system 21, depending on the desired power and other characteristics of the battery system 21. According to other exemplary embodiments, the battery modules 22 may be located in a configuration other than side-by-side (e.g., end-to-end, etc.).

As shown in FIGS. 3-4, the battery system 21 also includes a high voltage connector 28 located at one end of the battery system 21 and a service disconnect 30 located at a second end of the battery system 21 opposite the first end according to an exemplary embodiment. The high voltage connector 28 connects the battery system 21 to a vehicle 10. The service disconnect 30, when actuated by a user, disconnects the two individual battery modules 22 from one another, thus lowering the overall voltage potential of the battery system 21 by half to allow the user to service the battery system 21.

According to an exemplary embodiment, each battery module 22 includes a plurality of cell supervisory controllers (CSCs) 32 to monitor and regulate the electrochemical cells 24 as needed. According to other various exemplary embodiments, the number of CSCs 32 may differ. The CSCs 32 are mounted on a member shown as a trace board 34 (e.g., a printed circuit board). The trace board 34 includes the necessary wiring to connect the CSCs 32 to the individual electrochemical cells 24 and to connect the CSCs 32 to the battery management system (not shown) of the battery system 21. The trace board 34 also includes various connectors to make these connections possible (e.g., temperature connectors, electrical connectors, voltage connectors, etc.).

Still referring to FIGS. 3-4, each of the battery modules 22 includes a plurality of electrochemical cells 24 (e.g., lithium-ion cells, nickel-metal-hydride cells, lithium polymer cells, etc., or other types of electrochemical cells now known or hereafter developed). According to an exemplary embodiment, the electrochemical cells 24 are generally cylindrical lithium-ion cells configured to store an electrical charge. According to other exemplary embodiments, the electrochemical cells 24 could have other physical configurations (e.g., oval, prismatic, polygonal, etc.). The capacity, size, design, and other features of the electrochemical cells 24 may also differ from those shown according to other exemplary embodiments.

Each of the electrochemical cells 24 are electrically coupled to one or more other electrochemical cells 24 or other components of the battery system 21 using connectors provided in the form of bus bars 36 or similar elements. According to an exemplary embodiment, the bus bars 36 are housed or contained in bus bar holders 37. According to an exemplary embodiment, the bus bars 36 are constructed from a conductive material such as copper (or copper alloy), aluminum (or aluminum alloy), or other suitable material. According to an exemplary embodiment, the bus bars 36 may be coupled to terminals 38, 39 of the electrochemical cells 24 by welding (e.g., resistance welding) or through the use of fasteners 40 (e.g., a bolt or screw may be received in a hole at an end of the bus bar 36 and screwed into a threaded hole in the terminal 38, 39).

Referring now to FIGS. 5-8, a portion of a battery module 22 for use in a battery system 21 is shown according to an exemplary embodiment. The battery module 22 includes a plurality of electrochemical cells 24 provided in a first member or tray 42 (e.g., structure, housing, etc.). Although illustrated in FIG. 5 as having a particular number of electrochemical cells 24 (i.e., three rows of electrochemical cells arranged such that 14 electrochemical cells are arranged in each row, for a total of 42 electrochemical cells), it should be noted that according to other exemplary embodiments, a different number and/or arrangement of electrochemical cells 24 may be used in the battery module 22 depending on any of a variety of considerations (e.g., the desired power for the battery module 22, the available space within which the battery module 22 must fit, etc.).

According to an exemplary embodiment, the tray 42 receives the individual electrochemical cells 24 in the proper orientation for assembling the battery module 22. According to an exemplary embodiment, the tray 42 may also include features to provide spacing of the cells away from the bottom of the tray and/or from adjacent cells. For example, according to an exemplary embodiment, the trays may include a series of features shown as sockets 44 (e.g., openings, apertures, etc.) to locate and hold the electrochemical cells 24 in position above the bottom of the tray 42.

As shown in FIGS. 5-8, according to another exemplary embodiment, the tray 42 may also include features shown as bosses 46 that are intended to aid in the retention of a housing or cover (not shown) to enclose and/or retain the plurality of cells 24. According to another exemplary embodiment, the bosses 46 may also aid in securing the tray 42 within a structure or housing (such as, e.g., housing 23 shown in FIGS. 3-4) or to a vehicle. According to an exemplary embodiment, the tray 42 may be made of a polymeric material or other suitable material (e.g., electrically insulated material).

Figure 11:
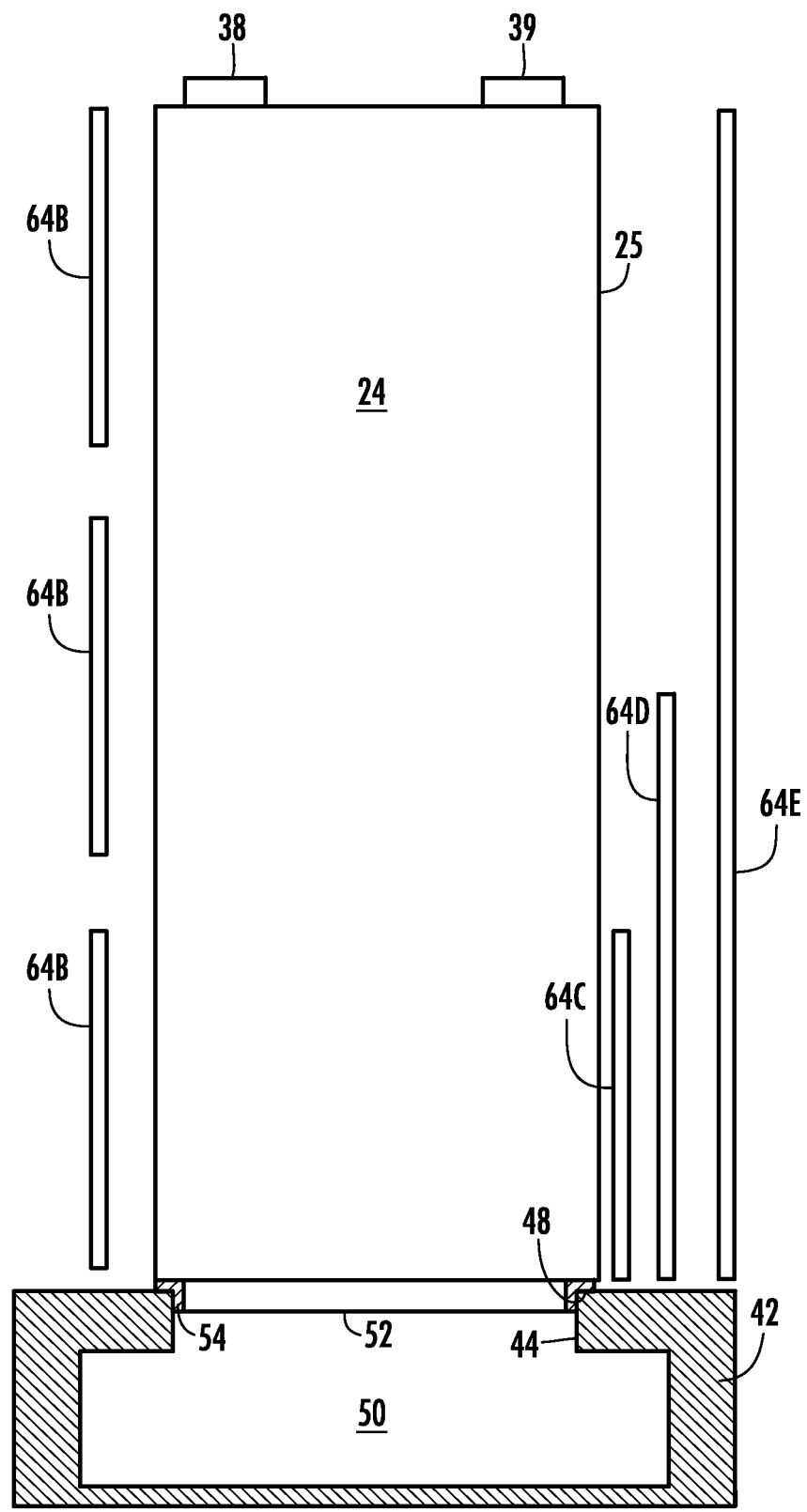
FIG. 11 is a schematic representation of various positions of fins for use in the thermal management systems of FIGS. 9-9A according to various exemplary embodiments.

According to an exemplary embodiment, the sockets 44 of the tray 42 are configured to receive (e.g., retain, hold, position, etc.) a lower end or portion of the individual electrochemical cells 24. According to an exemplary embodiment, the sockets 44 are generally circular openings having at least one step or surface 48 (e.g., as shown in FIG. 11) configured to receive the lower portion of the electrochemical cell 24. According to other exemplary embodiments, the openings of the sockets 44 may have other shapes to receive cells of different shapes (e.g., prismatic, oval, etc.). The lower step or surface 48 of the socket 44 positions the electrochemical cell 24 at a top portion of an airspace or chamber 50 defined by the tray 42 (e.g., as shown in FIG. 11). The chamber 50 is configured to receive gases and/or effluent that may be vented by the electrochemical cells 24 through a vent feature or vent device (e.g., vent 52 as shown in FIG. 11) of the electrochemical cell 24.

Figure 7:
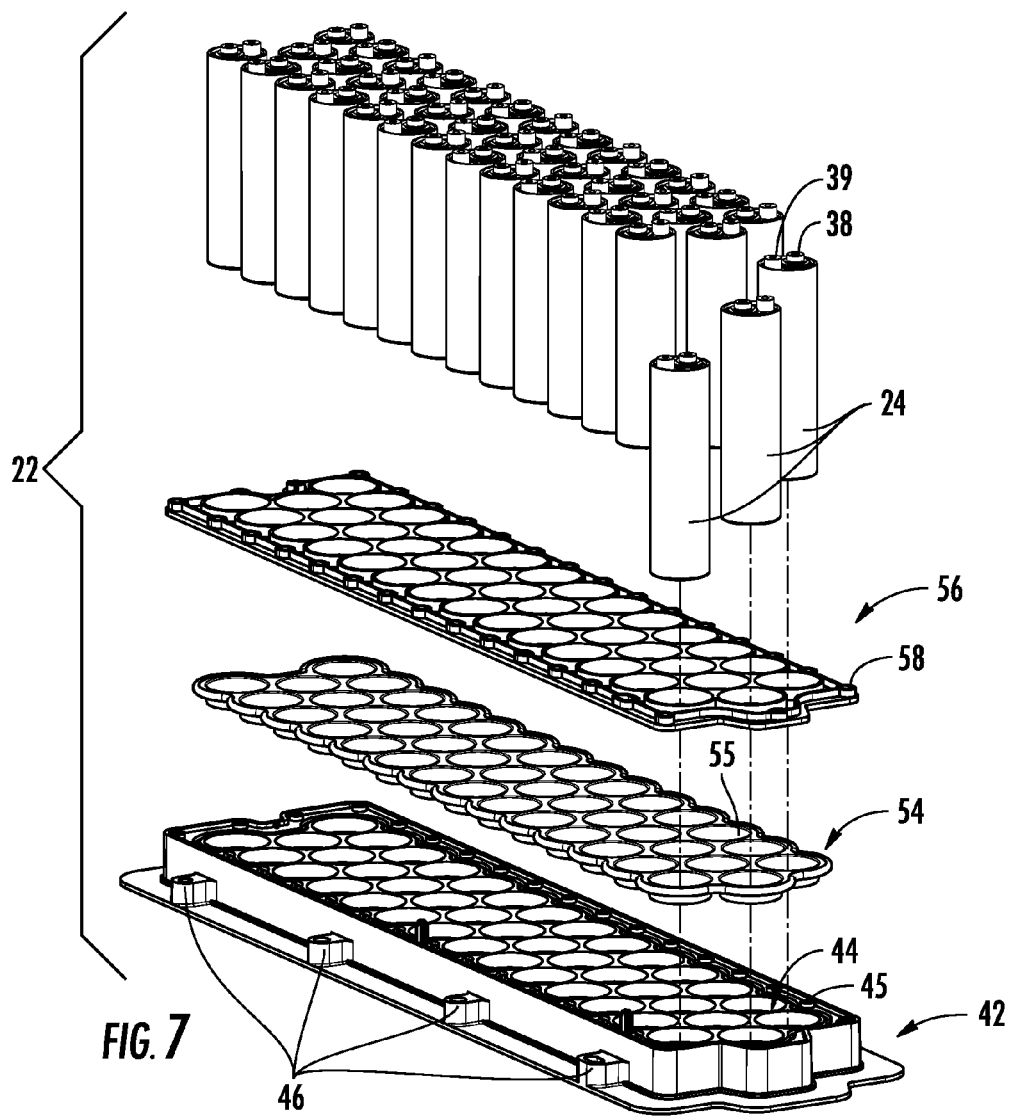
FIG. 7 is a partial exploded view of the battery module of FIG. 5.
Figure 8:
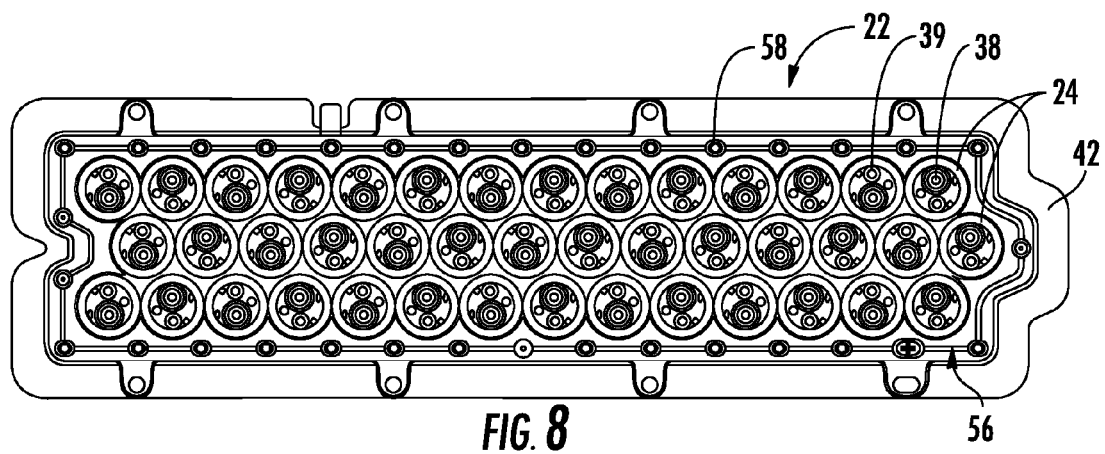
FIG. 8 is a top view of the battery module of FIG. 5.

Referring to FIG. 7, the battery module 22 may also include a member shown as a gasket or seal 54. According to an exemplary embodiment, the seal 54 is configured to aid in sealing the lower portions of the electrochemical cells 24 in the tray 42 to help retain any gases vented from the electrochemical cells 24 into the chamber 50. According to an exemplary embodiment, the seal 54 is provided adjacent a top surface of the tray 42. According to an exemplary embodiment, the seal 54 includes a plurality of openings 55 that align with the plurality of sockets 44 of the tray 42.

According to an exemplary embodiment, the seal 54 may be constructed from a pliable, non-conductive material such as silicone. According to another exemplary embodiment, the seal 54 may be die cut from a silicone sheet or may be a molded silicone member (e.g., made by an injection molding process). According to other exemplary embodiments, the seal may be any seal that is now known or developed in the future.

According to an exemplary embodiment, a member (fixture, device, plate, retainer, etc.) shown as a clamping plate 56 (see, e.g., FIG. 7) is provided above the seal 54 in order to keep the seal 54 in place in relation to the tray 42. The clamping plate 56 may be coupled to the tray 42, for example, by threaded fasteners (not shown) that extend through holes 58 in the clamping plate 56 and are received by threaded holes 45 in the tray 42. According to another exemplary embodiment, the clamping plate 56 may be coupled to the tray 42 via a snap fit.

Figure 9:
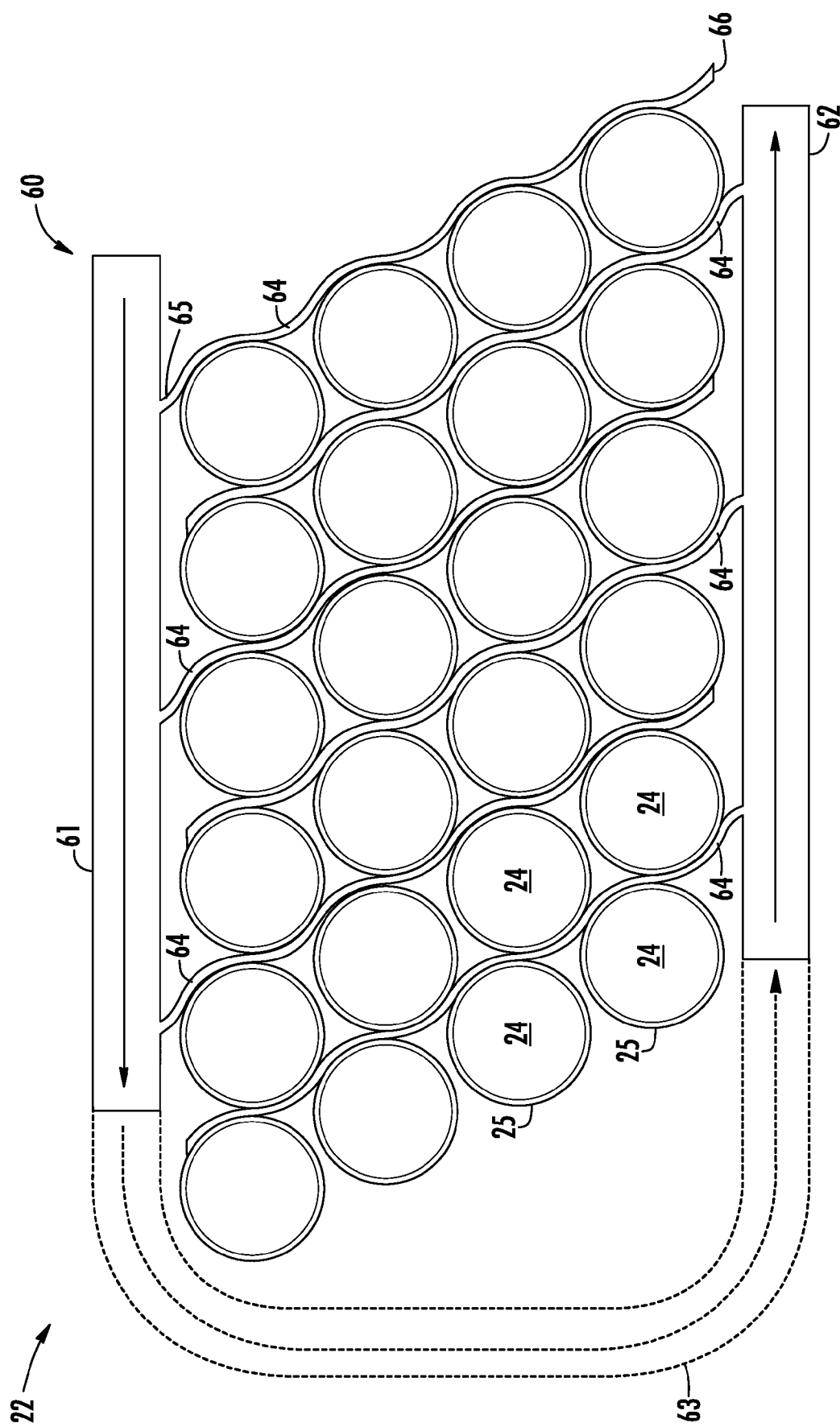
FIG. 9 is a partial top view of the battery module of FIG. 5 including a thermal management system having curved fins according to an exemplary embodiment.
Figure 10:
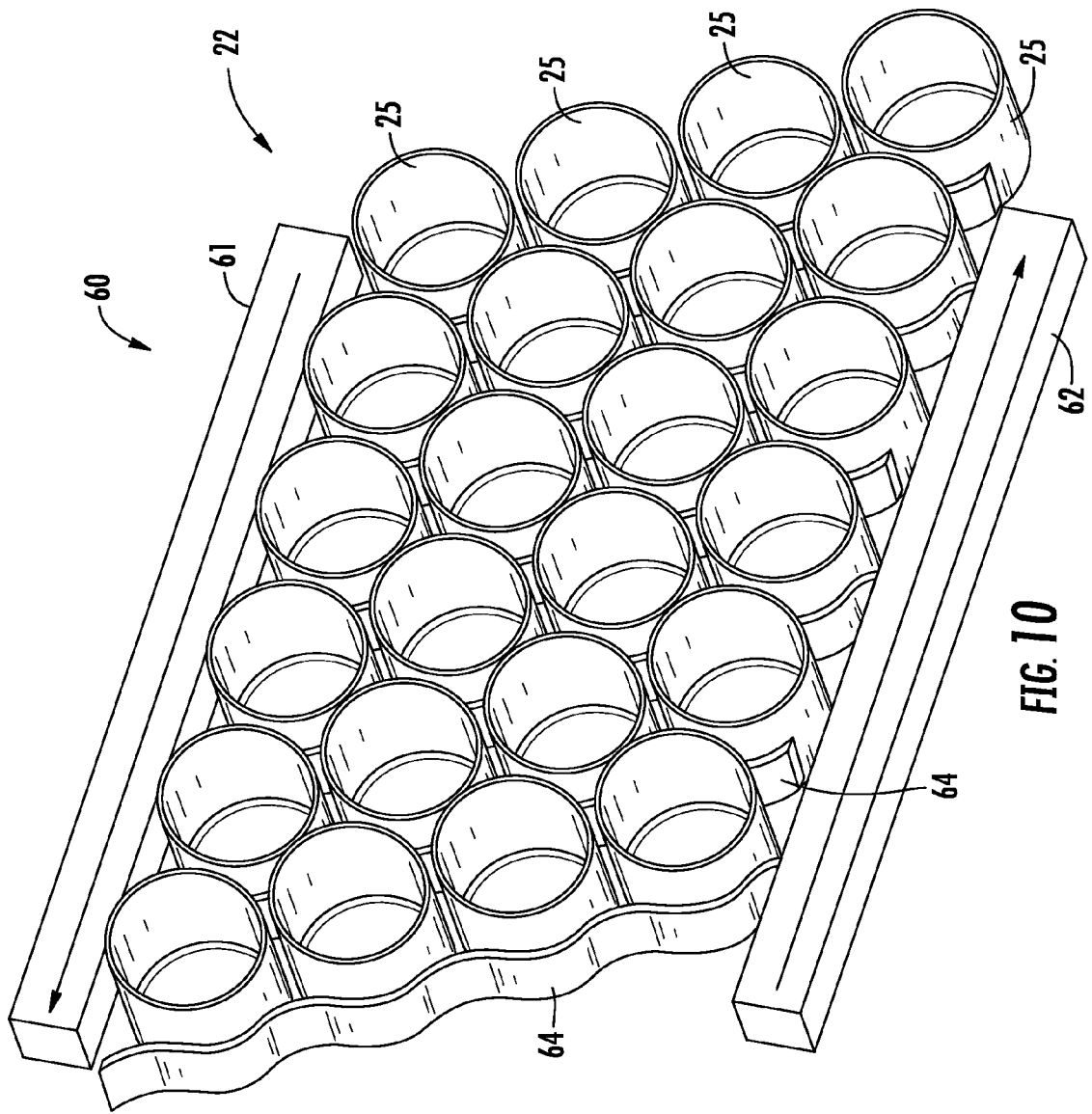
FIG. 10 is a partial perspective view of the battery module of FIG. 9 according to an exemplary embodiment.

Referring now to FIGS. 9-11, the battery module 22 is shown according to an exemplary embodiment to include a thermal management system 60. The thermal management system 60 includes a first thermal plate or manifold 61 provided on a first side of the battery module 22 and a second thermal plate or manifold 62 provided on a second side of the battery module 22 generally opposite of the first thermal plate 61.

Each of the thermal plates 61, 62 includes a plurality of projections or fins 64 that extend from the thermal plates 61, 62 into the spaces between the cells 24 in the battery module 22. For example, the fins 64 extend from a surface that is adjacent the battery module 22 (i.e., an internal surface of the thermal plates 61, 62). The fins 64 and thermal plates 61, 62 may be integrally formed or may be separate components that are mechanically coupled together (e.g., by welding such as laser welding). The fins 64 are configured to transfer heat to/from the cells 24 to the thermal plates 61, 62 (e.g., by conduction). According to an exemplary embodiment, the fins 64 are configured to contact an external surface of the housings 25 of the cells 24. According to another exemplary embodiment, the fins 64 do not contact the housings 25 of the cells 24, but are adjacent the housings 25 of the cells 24. According to an exemplary embodiment, the fins 64 may have a constant thickness, as shown in FIGS. 9-10, or according to another exemplary embodiment, the fins 64 have a tapering thickness such that they are thicker at a base 65 (i.e., closer to the thermal plate) and thinner near a tip 66. According to an exemplary embodiment, the fins 64 have a minimum thickness of at least 1 mm.

While the thermal plates 61, 62 are shown as being arranged on two opposite sides of vertically arranged cells 24, other arrangements are possible. For example, the thermal plates 61, 62 may be configured as upper and lower trays that receive the cells, with the fins 64 extending downward from the upper tray and upward from the lower tray. According to an exemplary embodiment, the thermal plates 61, 62 and/or the fins 64 are formed from a material with a high thermal conductivity such as aluminum (or aluminum alloy), copper (or copper alloy), or other material having suitable thermal conductivity to allow heat to be transferred to/from the cells 24.

Figure 9A:
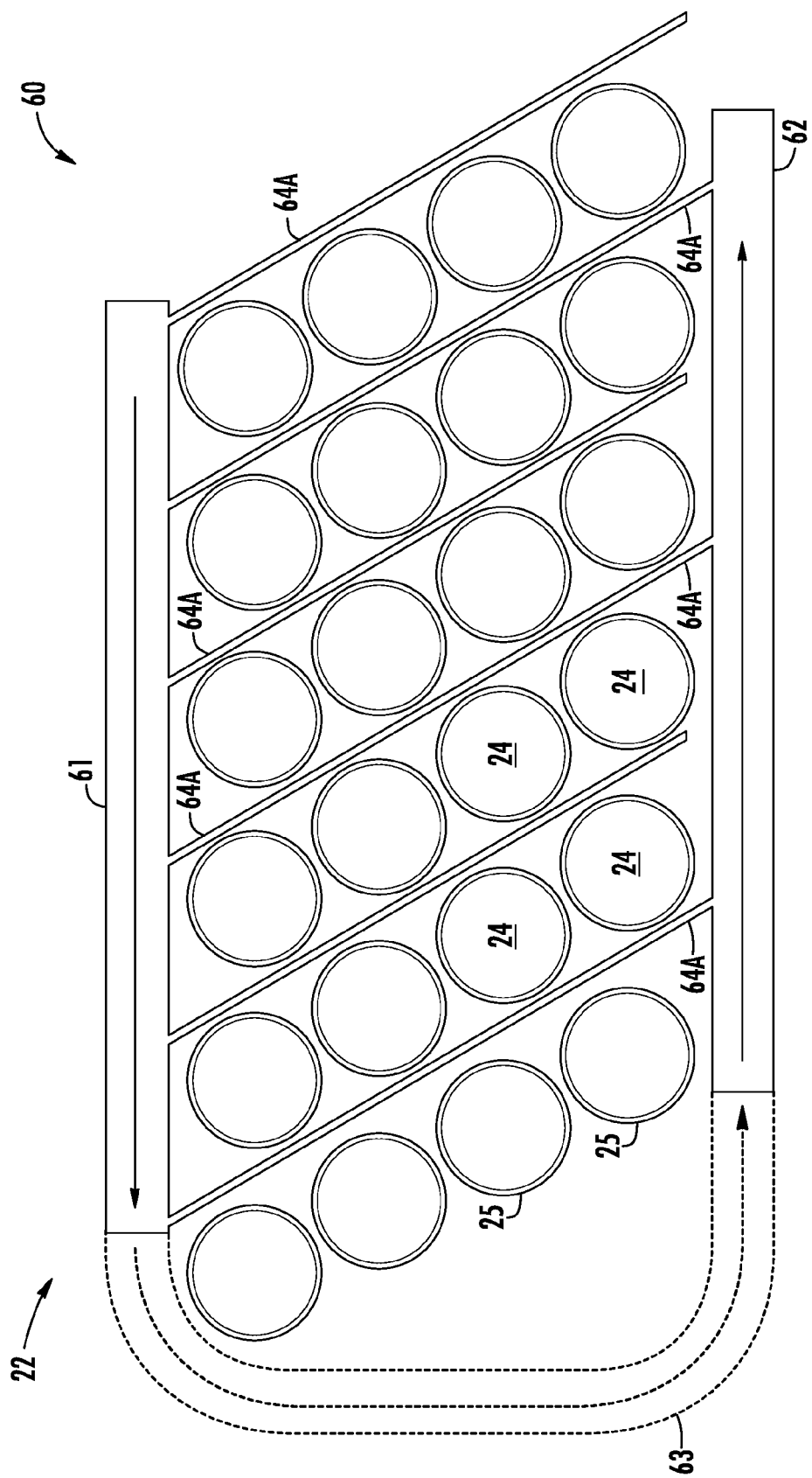
FIG. 9A is a partial top view of the battery module of FIG. 5 including a thermal management system having straight fins according to another exemplary embodiment.

According to one exemplary embodiment, the fins 64 have a wavy profile (e.g., a sine wave) that is shaped to match the curvature of a portion of the external surface of the housings 25 of the cells 24 (e.g., as shown in FIGS. 9-10). By matching the curvature of the cells 24, the area of contact between the fins 64 and the cells 24 is increased, thereby increasing the amount of heat that is conducted to/from the fins 64 and the cells 24. While the fins 64 are shown as being skewed or angled relative to the thermal plates 61, 62, according to other exemplary embodiments, the fins 64 may extend generally perpendicular to the thermal plate 61, 62. The fins 64 may have a free end, as shown in FIGS. 9-10, or may be connected on either end to one of the thermal plates 61, 62. According to other exemplary embodiments, the fins 64 may have another shape (e.g., a zig-zag profile, a cycloid profile, etc.), or may be straight, (e.g., such as fins 64A shown in FIG. 9A).

According to an exemplary embodiment, the housing 25 of each of the cells 24 is part of the conductive path for that cell 24 (i.e., the housing 25 may be conductively coupled to either the positive or the negative electrode of the cell). Thus, an electrically-insulating layer (e.g., an acrylic coating, a ceramic coating such as Alodine® EC2 commercially available from Henkel AG and Co., or other suitable material) may be provided on the fins 64 to electrically isolate the fins 64 from the cells 24. The electrically insulating layer is thermally conductive so it does not substantially diminish the ability of the fins 64 to provide thermal management (i.e., provide heating/cooling) to the cells 24. According to other exemplary embodiments, the electrically-insulating layer may be provided on or around the cells 24 instead of or in addition to the fins 64.

According to an exemplary embodiment, the thermal plates 61, 62 and/or the fins 64 extending from the thermal plates 61, 62 may be at least partially hollow in order to increase the thermal efficiency of the thermal plates 61, 62 and/or fins 64. According to an exemplary embodiment, the hollow thermal plates 61, 62 and/or fins 64 are configured for a thermal management fluid (e.g., water, water-glycol mixture, $CO_2$, refrigerant, etc.) to flow therethrough. This thermal management fluid may be circulated through the thermal plates 61, 62 (and fins 64) to further increase the thermal conductivity of the system. For example, a fan or pump (neither shown) may be provided to circulate the thermal management fluid through the thermal plates 61, 62. It should be noted that hollow thermal plates 61, 62 may be used in combination with solid (not hollow) fins 64, or that solid (not hollow) thermal plates 61, 62 may be used in combination with hollow fins 64.

As shown in FIGS. 9-10, the flow of the thermal management fluid may be a counterflow arrangement (i.e., the flow of the thermal transfer fluid in the first thermal plate 61 flows in the opposite direction in relation to the second thermal plate 62). According to other exemplary embodiments, the flow in both thermal plates 61, 62 may flow in the same direction (e.g., for parallel flow). According to another exemplary embodiment, the thermal plates 61, 62 may be connected to one another (e.g. by a connection member shown as a connecting thermal plate 63) so that the thermal management fluid flows from the first thermal plate 61 to the second thermal plate 62.

Figure 16:
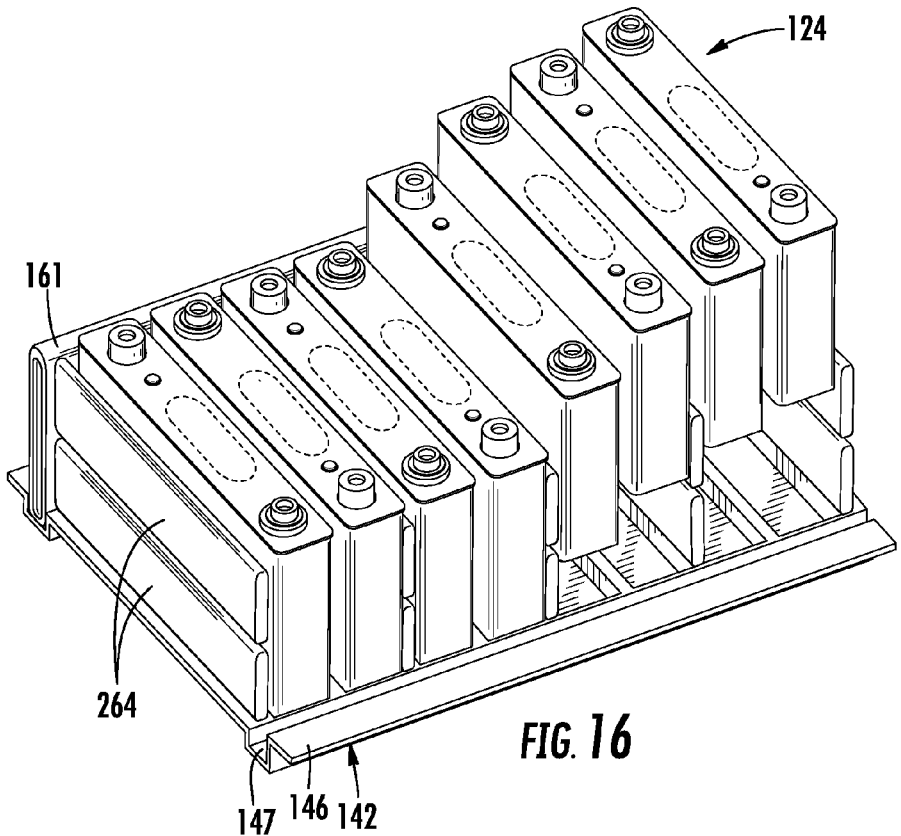
FIG. 16 is a partial exploded perspective view of the battery module of FIG. 12 having pairs of cooling fins according to an exemplary embodiment.
Figure 17:
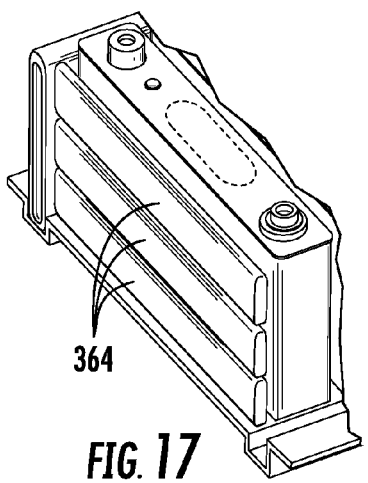
FIGS. 17-18 are partial perspective views of various fin configurations for use in a thermal management system according to an exemplary embodiment.
Figure 18:
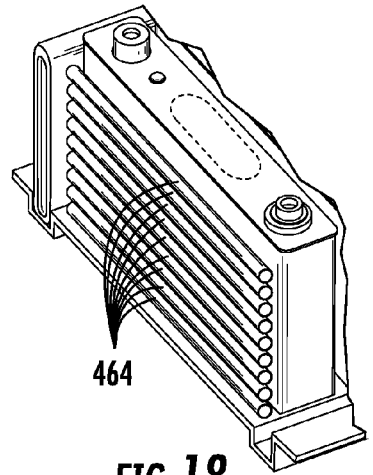

As shown in FIGS. 10-11, according to one exemplary embodiment, the fins may have a height that is less than the overall height of the cells (e.g., fins 64 shown in FIG. 10 and fins 64B-64D shown in FIG. 11). According to other exemplary embodiments, the fins may have a height that is substantially equal to the overall height of the cells 24 (e.g., fins 64E). If the fins have a height that is less than the height of the cells, multiple thermal plates may be stacked or otherwise arranged such that the individual fins of the stacked thermal plates are also stacked or aligned with one another (e.g., such as stacked fins 64B shown in FIG. 11) to provide additional heat removing capabilities. According to other exemplary embodiments, each individual thermal plate may have multiple fins that are stacked or vertically aligned with one another (i.e., the multiple fins are stacked vertically upon one another such as shown in FIGS. 16-17) such that each fin has a height that is less than the overall height of the cells but the height of the combination of the stacked fins is substantially equal to the overall height of the cells. According to another exemplary embodiment, each thermal plate may have multiple fins that are not aligned on top of one another (e.g., such as fins 64C-64E shown in FIG. 11). It should be noted that many different fin configurations and placement of fins are possible, and that one of ordinary skill in the art would readily recognize should possible configurations and placements are included within the scope of this application.

Referring now to FIGS. 12-19, a battery module 122 is shown according to another exemplary embodiment. The battery module 122 includes a plurality of electrochemical cells 124 arranged in a structure shown as a tray 142. A housing or covering (not shown) may be provided to substantially enclose or surround the plurality of electrochemical cells 124. The battery module 122 is configured for use in a battery system for a vehicle (such as vehicle 10 or 10A shown in FIGS. 1-2, respectively).

According to an exemplary embodiment, the tray 142 includes a plurality of slots or sockets 144. Each socket 144 includes a step or sidewall 148 and is configured to receive a lower portion of one of the electrochemical cells 124. The sockets 144 aid in retaining and positioning each of the electrochemical cells 124 within the battery module 122. According to an exemplary embodiment, the tray 142 includes a set of slots or grooves 147 configured to receive a portion of the thermal management system 160 (for example, each groove 147 receives a portion of a thermal plate 161, 162 of the thermal management system 160).

According to an exemplary embodiment, each electrochemical cell 124 includes a first or negative terminal 138 and a second or positive terminal 139. Each electrochemical cell 124 also includes a vent 152 and a fill hole plug 129 provided in a cover 126 of the housing 125 of the cell 124. The fill hole plug 129 is inserted into the fill hole after the electrochemical cell 124 has been filled with electrolyte.

According to an exemplary embodiment, the electrochemical cells 124 are generally prismatic lithium-ion cells configured to store an electrical charge. According to other exemplary embodiments, the electrochemical cells 124 could have other physical configurations (e.g., oval, cylindrical, polygonal, etc.). The capacity, size, design, and other features of the electrochemical cells 124 may also differ from those shown according to other exemplary embodiments. Each of the electrochemical cells 124 are electrically coupled to one or more other electrochemical cells 124 or other components of the battery module 122 using connectors or bus bars (not shown).

According to an exemplary embodiment, the battery module 122 includes a thermal management system 160 configured to provide thermal management to the electrochemical cells 124. The thermal management system 160 includes a first thermal plate or manifold 161 and a second thermal plate or manifold 162. According to an exemplary embodiment, each thermal plate 161, 162 includes a series or plurality of projections or fins 164 (e.g., plates, members, etc.) that extend out from a surface (i.e., a surface facing the battery module 122, or in other words, an internal surface) of each thermal plate 161, 162.

Figure 12:
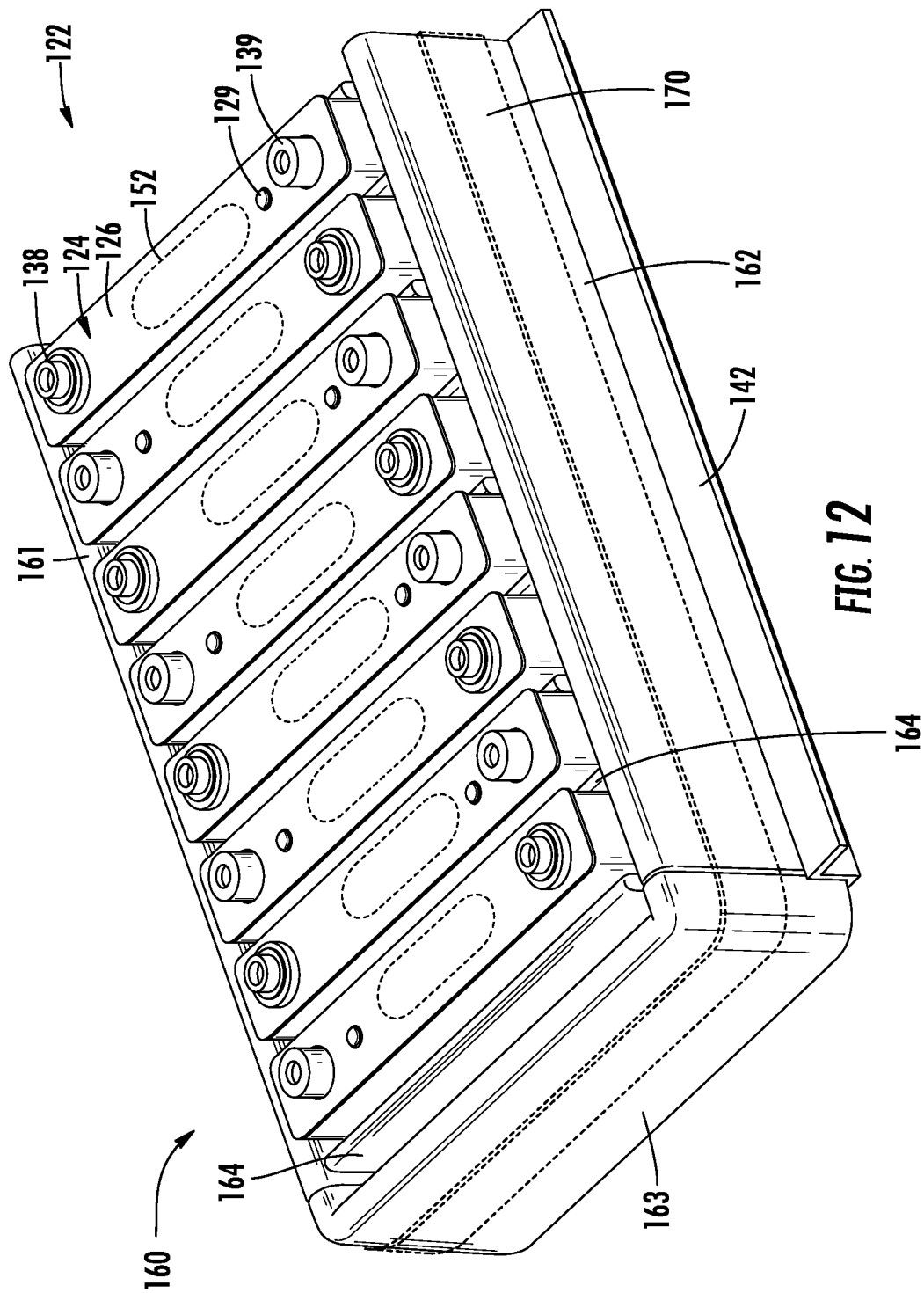
FIG. 12 is a partial perspective view of a battery module having a thermal management system according to another exemplary embodiment.
Figure 13:
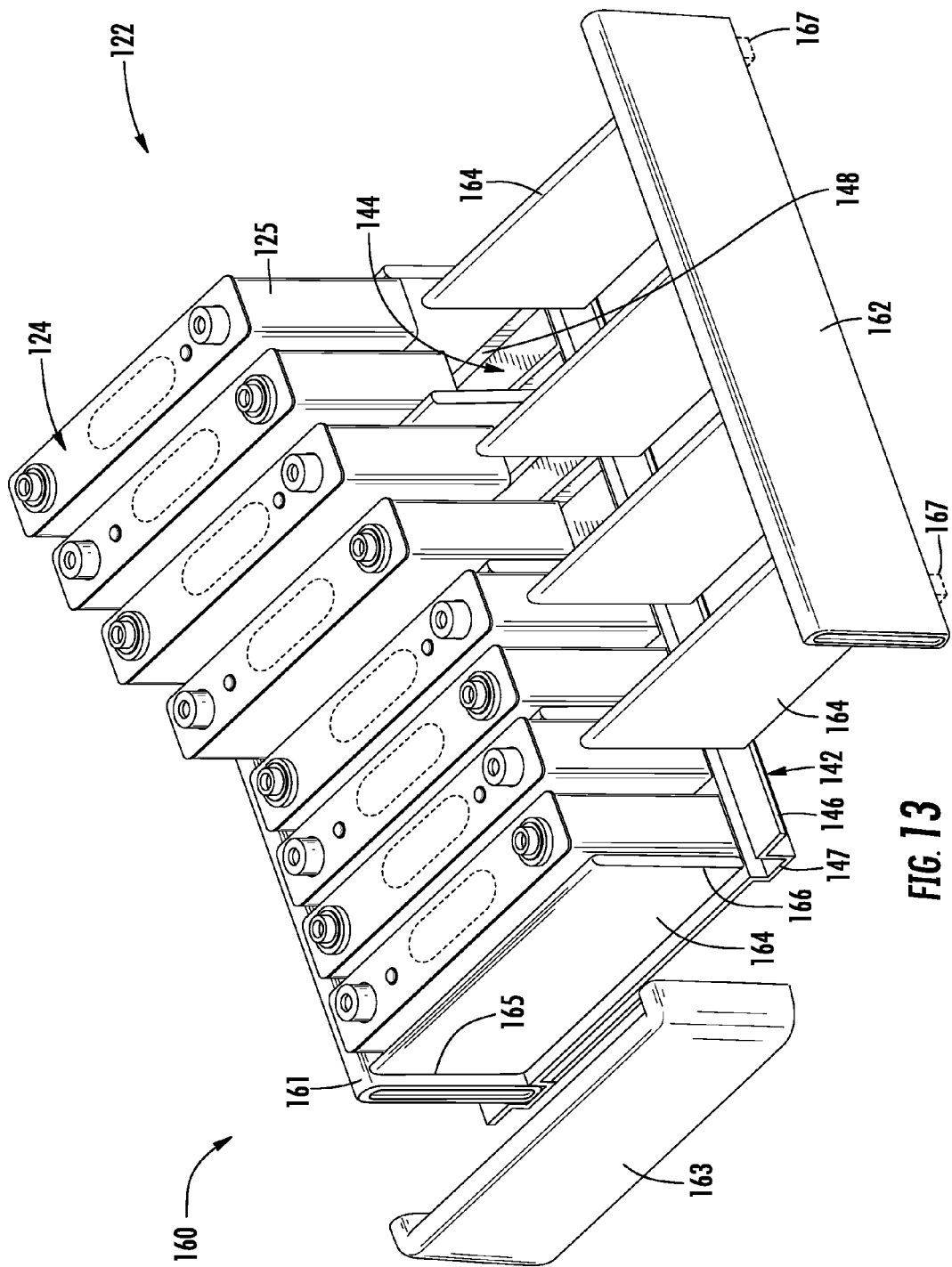
FIG. 13 is a partial exploded perspective view of the battery module of FIG. 12 according to an exemplary embodiment.

According to one exemplary embodiment, the fins 164 are solid members and provide conductive cooling and/or heating to the electrochemical cells 124. However, according to another exemplary embodiment, the fins 164 may be hollow or have an internal chamber or passageway that is configured to pass a fluid therethrough to heat or cool the electrochemical cells 124. As shown in FIGS. 12-15, the fins 164 extend out from the surface of each thermal plate 161, 162 in a generally perpendicular direction to that of the surface of each thermal plate 161, 162. However, according to another exemplary embodiment, the fins 164 may extend out from the thermal plates 161, 162 in a different configuration (e.g., at an angle). The fins 164 may have a free end or tip 166 (e.g., as shown in FIG. 13), or may be connected on either end to one of the thermal plates 161, 162 (not shown).

The fins 164 and thermal plates 161, 162 may be integrally formed or may be separate components that are mechanically coupled together (e.g., by welding, such as laser welding). According to an exemplary embodiment, the fins 164 are configured to contact an external surface of the housings 125 of the cells 124. According to another exemplary embodiment, the fins 164 do not contact the housings 125 of the cells 124.

According to another exemplary embodiment, the fins 164 have generally the same thickness from a base 165 to a tip 166 of the fins 164. However, according to another exemplary embodiment, the fins 164 may be otherwise configured. For example, the fins may have a slight taper (e.g., the base 165 may have a thickness that is greater than the tip 166). According to an exemplary embodiment, the fins 164 have a minimum thickness of at least 1 mm.

While the thermal plates 161, 162 are shown as being arranged on two opposite sides of vertically arranged cells 124, other arrangements are possible. For example, the thermal plates 161, 162 may be configured as upper and lower trays that receive the cells (e.g., in place of tray 142), with the fins 164 extending downward from the upper tray and upward from the lower tray. According to an exemplary embodiment, the thermal plates 161, 162 and/or the fins 164 are formed from a material with a high thermal conductivity such as aluminum (or aluminum alloy), copper (or copper alloy), or other material having suitable thermal conductivity to allow heat to be transferred to/from the cells 124.

According to an exemplary embodiment, the housing 125 of each of the cells 124 is part of the conductive path for that cell 124 (i.e., the housing 125 may be conductively coupled to either the positive or the negative electrode of the cell). Thus, an electrically-insulating layer (e.g., an acrylic coating or a ceramic coating such as Alodine® EC2 commercially available from Henkel AG and Co. or other suitable material) may be provided on the fins 164 to electrically isolate the fins 164 from the cells 124. The electrically insulating layer is thermally conductive so it does not substantially diminish the ability of the fins 164 to provide thermal management (i.e., provide heating/cooling) to the cells 124. According to other exemplary embodiments, the electrically-insulating layer may be provided on or around the cells 124 instead of or in addition to the fins 164.

According to an exemplary embodiment, the thermal plates 161, 162 and/or the fins 164 extending from the thermal plates 161, 162 may be at least partially hollow to increase the thermal efficiency of the thermal plates 161, 162 and/or fins 164. According to an exemplary embodiment, the hollow thermal plates 161, 162 and/or fins 164 are configured for a thermal management fluid (e.g., water, water-glycol mixture, $CO_2$, refrigerant, etc.) to flow therethrough. This thermal management fluid may be circulated through the thermal plates 161, 162 and/or fins 164 to further increase the thermal conductivity of the system. For example, a fan or pump (neither shown) may be provided to circulate the thermal management fluid through the thermal plates 161, 162. It should be noted that hollow thermal plates 161, 162 may be used in combination with solid (not hollow) fins 164, or that solid (not hollow) thermal plates 161, 162 may be used in combination with hollow fins 164.

Figure 14:
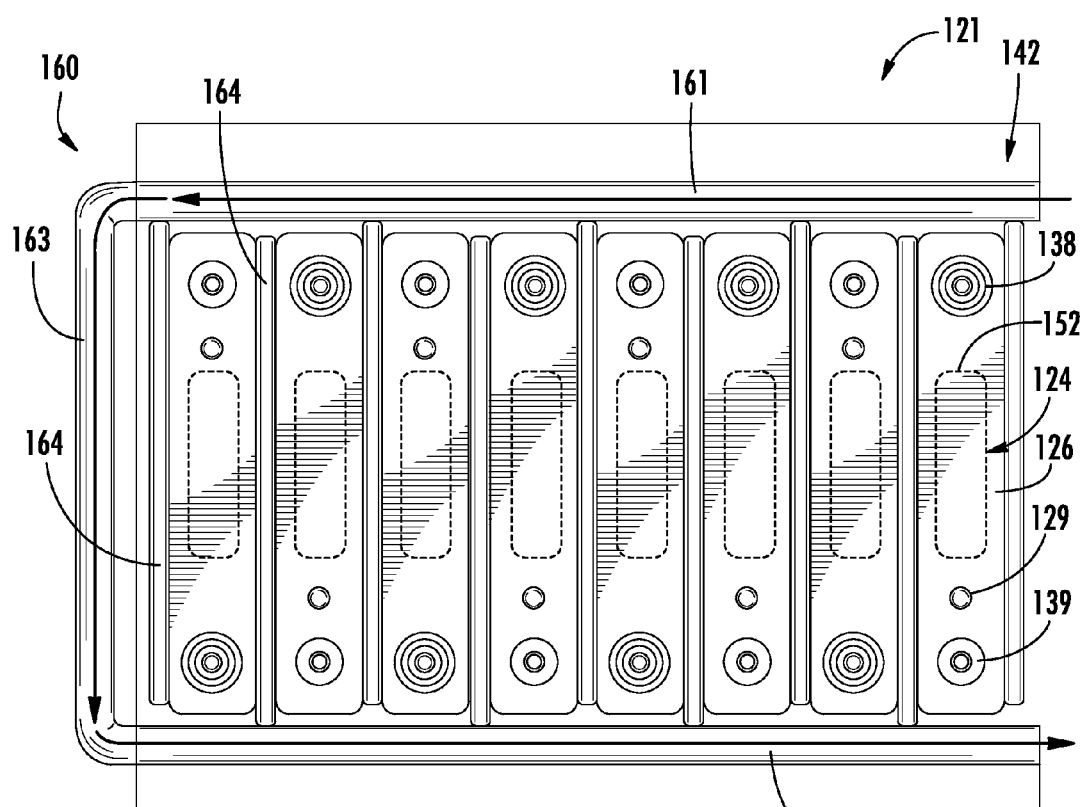
FIG. 14 is a partial top view of the battery module of FIG. 12 according to an exemplary embodiment.

According to an exemplary embodiment, the first thermal plate 161 and the second thermal plate 162 are connected by a connection member shown as a connecting thermal plate 163. As such, the fluid flow through the thermal management system 160 is configured to flow into the first thermal plate 161, through the connecting thermal plate 163, and then through the second thermal plate 162, such as shown in FIG. 14. In this embodiment, the thermal management fluid enters and exits the thermal management system 160 at the same end of the battery module 122.

Figure 15:
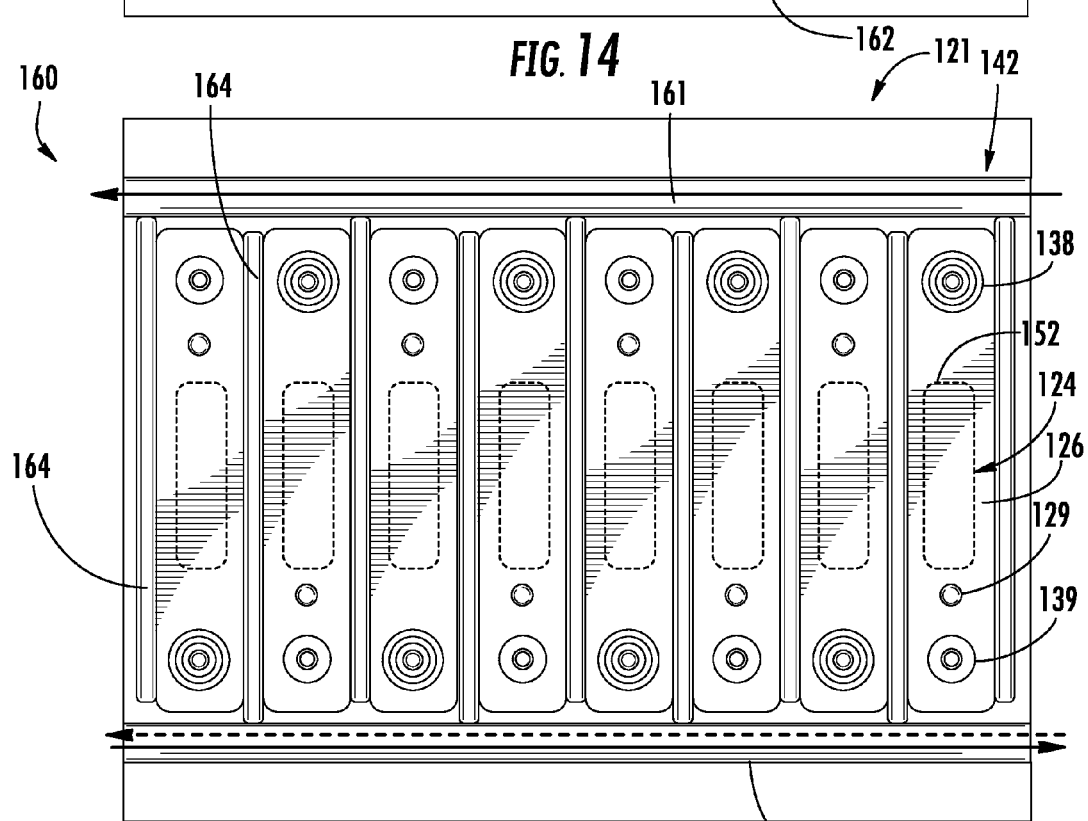
FIG. 15 is a partial top view of the battery module of FIG. 12 shown without a connection member according to an exemplary embodiment.

According to other exemplary embodiments, however, fluid flow through the thermal plates 161, 162 may be alternatively configured. For example, as shown in FIG. 15, fluid flow through the thermal management system 160 may be in a parallel manner such that fluid enters the first thermal plate 161 and the second thermal plate 162 at a first end of the battery module 122, and then exits the thermal plates 161, 162 at a second end of the battery module 122 (e.g., for parallel fluid flow). Alternatively, a connecting thermal plate 163 may not be used and yet the fluid flow through one thermal plate (e.g., first thermal plate 161) may be converse or in an opposite direction to the fluid flow of the second thermal plate (e.g., the second thermal plate 162). In either of the above two examples, the connecting thermal plate 163 may not be used.

As shown in FIGS. 14-15, according to an exemplary embodiment, cooling or heating of each of the electrochemical cells 124 occurs on all four sides of the electrochemical cells 124. In other words, cooling or heating is provided along a first side of electrochemical cell 124 by a fin 164 from the first thermal plate 161 and a second side of the electrochemical cell 124 by a fin 164 of the second thermal plate 162. Additionally, the first end or edge of the electrochemical cell 124 is cooled or heated by the first thermal plate 161 and a second end or edge of the electrochemical cell 124 is cooled or heated by the second thermal plate 162. As such, each electrochemical cell 124 is efficiently cooled or heated, with the cooling or heating being provided substantially around the entire perimeter of each individual electrochemical cell 124.

According to an exemplary embodiment, a portion of each thermal plate 161, 162 is provided within a groove 147 of the tray 142. For example, the tray 142 includes a U-shaped groove 147 that is configured to receive at least a lower portion of each thermal plate 161, 162. According to another exemplary embodiment, each thermal plate 161, 162 includes an optional foot or projection 167 which is configured to be received by the groove 147 of the tray 142 to properly retain and position each of the thermal plates 161, 162.

According to an exemplary embodiment, the tray 142 includes a flange or projection 146 (e.g., such as shown in FIG. 13). The flange 146 is configured to aid in securing the battery module 122 within a housing (such as housing 23 shown in FIGS. 3-4) or within a vehicle (such as vehicle 10 or 10A shown in FIGS. 1-2, respectively). The flange 146 may also be configured to secure a cover (not shown) around the cells 124. According to an exemplary embodiment, the flange 146 may include holes or apertures (not shown) to facilitate securing the battery module 122.

According to an exemplary embodiment, the battery module 122 includes a clamping system. The clamping system is shown to include a band (e.g., a metal band 170 as shown in FIG. 12) that is provided to clamp or restrain the cells 124 together. As shown in FIG. 12, the metal band 170 is provided about an external surface of each of the first thermal plate 161, second thermal plate 162, and the connecting thermal plate 163. A buckle or other tightening device (not shown) may also be provided to aid in tightening the metal band 170.

By tightening the metal band 170, the first and second thermal plates 161, 162 are brought closer to each other until the internal surfaces of each of the thermal plates 161, 162 are brought into contact with the ends or edges of the cells 124. In this way, a clamping or restraining force is exerted on the cells 124. According to this embodiment, the connecting thermal plate 163 may include one or more flexible portions (such as, e.g., in the middle of the connecting thermal plate 163 or at the ends of the connecting thermal plate 163), or the connecting thermal plate 163 may not be included with the battery module 122.

As shown in FIGS. 12-15, each of the fins 164 of each thermal plate 161, 162 is a generally flat one-piece member. However, according to other exemplary embodiments, the thermal plates 161, 162 may include a subset of fins (e.g., multiple fins) in place of the single fin 164. For example, as shown in FIG. 16, the thermal plate 161 includes a set or pair of fins 264 that extend out from the surface of the thermal plate 161. As can be seen in FIG. 16, the pair of fins 264 generally take the same place or position as the fin 164 shown in FIGS. 12-15. According to the exemplary embodiment shown in FIG. 16, there is an intermediate space provided between the pair of fins 264. However, according to other exemplary embodiments, the pair of fins 264 may be provided in contact with one another such that the intermediate space does not exist.

According to another exemplary embodiment, as shown in FIG. 17, a thermal plate or manifold includes a set of three fins 364 instead of two fins 264 as shown in FIG. 16 or a single fin 164 as shown in FIGS. 12-15. As shown in FIG. 17, an intermediate space is provided in between adjacent fins 364. However, according to an exemplary embodiment, the fins 364 may be provided in contact with one another such that no immediate space is provided.

According to yet another exemplary embodiment, a plurality of rods 464 are provided in place of each single fin 164 (shown in FIGS. 12-15) or multiple fins 264, 364 (shown in FIGS. 16-17, respectively). According to the exemplary embodiment shown in FIG. 18, the plurality of rods 464 are generally cylindrical-shaped solid members or rods. According to an exemplary embodiment, each rod 464 is provided in contact with an adjacent rod 464 so that no intermediate space is provided in between adjacent rods 464. However, according to other exemplary embodiments, the rods 464 may not be provided in direct contact with one another such that an intermediate space is provided in between adjacent rods 464.

It should be noted that any number of fins or rods (or other members) may be used in combination with the thermal plates 161, 162. For example, rods having square or rectangular cross-sections may be used. It should also be noted that the external contours of the various fins and rods shown in FIGS. 12-18 may vary. For example, instead of the rounded contours of the fins and rods shown in FIGS. 12-18, square or right angle contours may be used.

Figure 19:
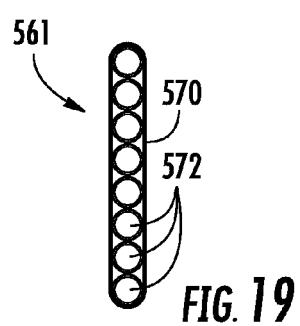
FIG. 19 is a end view of a thermal plate for use in a thermal management system according to an exemplary embodiment.

According to another exemplary embodiment, the thermal plates for the thermal management system may include a plurality of individual members or tubes. For example, as shown in FIG. 19, a thermal plate or manifold 561 may include a plurality of hollow tubes 572 provided generally in line with one another. The plurality of hollow tubes 572 are configured to aid in directing the thermal management fluid through the thermal plate 561. For example, the hollow tube 572 may be configured to aid in linear flow of the thermal management fluid. As shown in FIG. 19, each of the hollow tubes 572 is in contact with another hollow tube 572. However, according to another exemplary embodiment, a space may be provided between one or more of the hollow tubes 572.

Also shown in FIG. 19, according to an exemplary embodiment, the thermal plate 561 includes an outer covering or layer 570 configured to aid in the construction and rigidity of the thermal plate 561. In other words, the outer layer 570 aids in retaining and coupling each individual hollow tube 572 together within thermal plate 561. According to an exemplary embodiment, the outer layer 570 may not be used with the thermal plate 561.

It should be noted that the exact configuration of the hollow tubes may vary. For example, the tubes may have a square or rectangular cross-section instead of the circular cross-section shown in FIG. 19. It should also be noted that the external contours of the various thermal plates shown in FIGS. 12-19 may vary. For example, instead of the rounded contours of the thermal plates shown in FIGS. 12-19, square or right angle contours may be used. It should also be noted that any of the specific embodiments shown in FIGS. 1-19 may be used alone or in various combinations with any of the other specific embodiments shown in FIGS. 1-19.

According to an exemplary embodiment, a battery module includes a plurality of cells arranged within the battery module (e.g., in a plurality of offset rows, or in a single line or row). Other features of the battery module may include at least one cooling member or plate located on a side of the battery module, the at least one cooling member may be solid or may be configured to receive a cooling fluid. The at least one cooling member may have a series of projections extending outwardly therefrom, with each projection extending through the row or rows of cells.

According to an exemplary embodiment, each projection may be hollow to receive cooling fluid from the cooling member. According to another exemplary embodiment, each projection may be solid. According to an exemplary embodiment, each projection is substantially straight. According to another exemplary embodiment, each projection is shaped to correspond to the offset configuration of the cells. According to another exemplary embodiment, each projection is tapered from the cooling member to an end of the projection.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the thermal management system for a battery system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A battery module comprising:
   a plurality of electrochemical cells arranged within the battery module; and
   a thermal management system configured to provide thermal management to the plurality of electrochemical cells, the thermal management system comprising:
      a first thermal plate provided adjacent a first side of the battery module; and
      a second thermal plate provided adjacent a second side of the battery module opposite that of the first side of the battery module;
      wherein the first thermal plate comprises a plurality of first integral fins that extends from the first thermal plate toward the second side of the battery module such that first free ends of the plurality of first integral fins are disposed proximate to the second thermal plate, wherein the second thermal plate comprises a plurality of second integral fins that extends from the second thermal plate toward the first side of the battery module such that second free ends of the plurality of second integral fins are disposed proximate to the first thermal plate, wherein the plurality of first integral fins does not contact the second thermal plate and the plurality of second integral fins does not contact the first thermal plate, and wherein the plurality of first integral fins and the plurality of second integral fins are arranged in an alternating order such that each electrochemical cell of the plurality of electrochemical cells is disposed between a respective first integral fin of the plurality of first integral fins and a respective second integral fin of the plurality of second integral fins.

2. The battery module of claim 1, wherein the first and second thermal plates are hollow and are configured to have a thermal management fluid flow therethrough to aid in the thermal management of the plurality of electrochemical cells.

3. The battery module of claim 2, wherein flow of the thermal management fluid through the first thermal plate is in a direction generally similar to flow of the thermal management fluid through the second thermal plate.

4. The battery module of claim 2, further comprising a connection member provided intermediate the first thermal plate and the second thermal plate such that flow of the thermal management fluid through the first thermal plate is in a direction generally opposite flow of the thermal management fluid through the second thermal plate.

5. The battery module of claim 2, wherein the first and second thermal plates comprise a series of hollow tubes configured to aid in linear flow of the thermal management fluid through the first and second thermal plates.

6. The battery module of claim 1, wherein each first and second integral fin of the plurality of first and second integral fins, respectively, is a generally flat member.

7. The battery module of claim 6, wherein each first and second integral fin of the plurality of first and second integral fins, respectively, is a solid plate and does not comprise a hollow cavity.

8. The battery module of claim 1, wherein the height of each first and second integral fin of the plurality of first and second integral fins, respectively, is generally equal to the height of the plurality of electrochemical cells.

9. The battery module of claim 1, wherein each first and second integral fin of the plurality of first and second integral fins, respectively, comprises a subset of stacked fins.

10. The battery module of claim 1, wherein each first and second integral fin of the plurality of first and second integral fins, respectively, comprises a plurality of stacked rods.

11. The battery module of claim 1, wherein each first and second integral fin of the plurality of first and second integral fins, respectively is tapered from a base of the fin to a tip of the fin.

12. The battery module of claim 1, wherein each first and second integral fin of the plurality of first and second integral fins is hollow.

13. The battery module of claim 1, wherein the combination of the first thermal plate, the second thermal plate, at least one first integral fin of the plurality of first integral fins, and at least one second integral fin of the plurality of second integral fins substantially surrounds at least one electrochemical cell of the plurality of electrochemical cells to provide thermal management for the at least one electrochemical cell.

14. The battery module of claim 1, further comprising a tray comprising a plurality of sockets, each one of the plurality of sockets configured to receive at least a portion of one of the plurality of electrochemical cells.

15. The battery module of claim 14, wherein the tray comprises features for receiving at least a portion of the first and second thermal plates.

16. A battery module comprising:
    a plurality of electrochemical cells; and
    a thermal management system configured to provide thermal management to the plurality of electrochemical cells, the thermal management system comprising:
       a first thermal plate comprising a series of first projections that extends from the first thermal plate and in between a first portion of the plurality of electrochemical cells, wherein the first thermal plate includes a first hollow portion configured to enable fluid flow through the first thermal plate in a first direction; and a second thermal plate comprising a series of second projections that extends from the second thermal plate and in between a second portion of the plurality of electrochemical cells, wherein the second thermal plate includes a second hollow portion configured to enable fluid flow through the second thermal plate in a second direction;

wherein the series of first projections extends toward the second thermal plate without touching the second thermal plate, wherein the series of second projections extends toward the first thermal plate without touching the first thermal plate, and wherein the series of first projections and the series of second projections are arranged in an alternating order such that each electrochemical cell of the plurality of electrochemical cells is disposed between a respective first projection of the series of first projections and a respective second projection of the series of second projections.

17. The battery module of claim 16, wherein each first and second projection of the series of first and second projections, respectively, is a generally flat and solid plate.

18. The battery module of claim 16, wherein the combination of the first thermal plate, the second thermal plate, at least one first projection of the series of first projections, and at least one second projection of the series of second projections surrounds at least one electrochemical cell of the plurality of electrochemical cells to provide thermal management for that electrochemical cell.

19. The battery module of claim 16, wherein the first direction is substantially opposite of the second direction.

20. The battery module of claim 19, comprising a connecting member configured to fluidly couple a first end of the first thermal plate with a second end of the second thermal plate to enable a fluid flowing in the first direction in the first thermal plate to flow in the second direction in the second thermal plate.

* * * * *